United States Patent Office 2,721,162
Patented Oct. 18, 1955

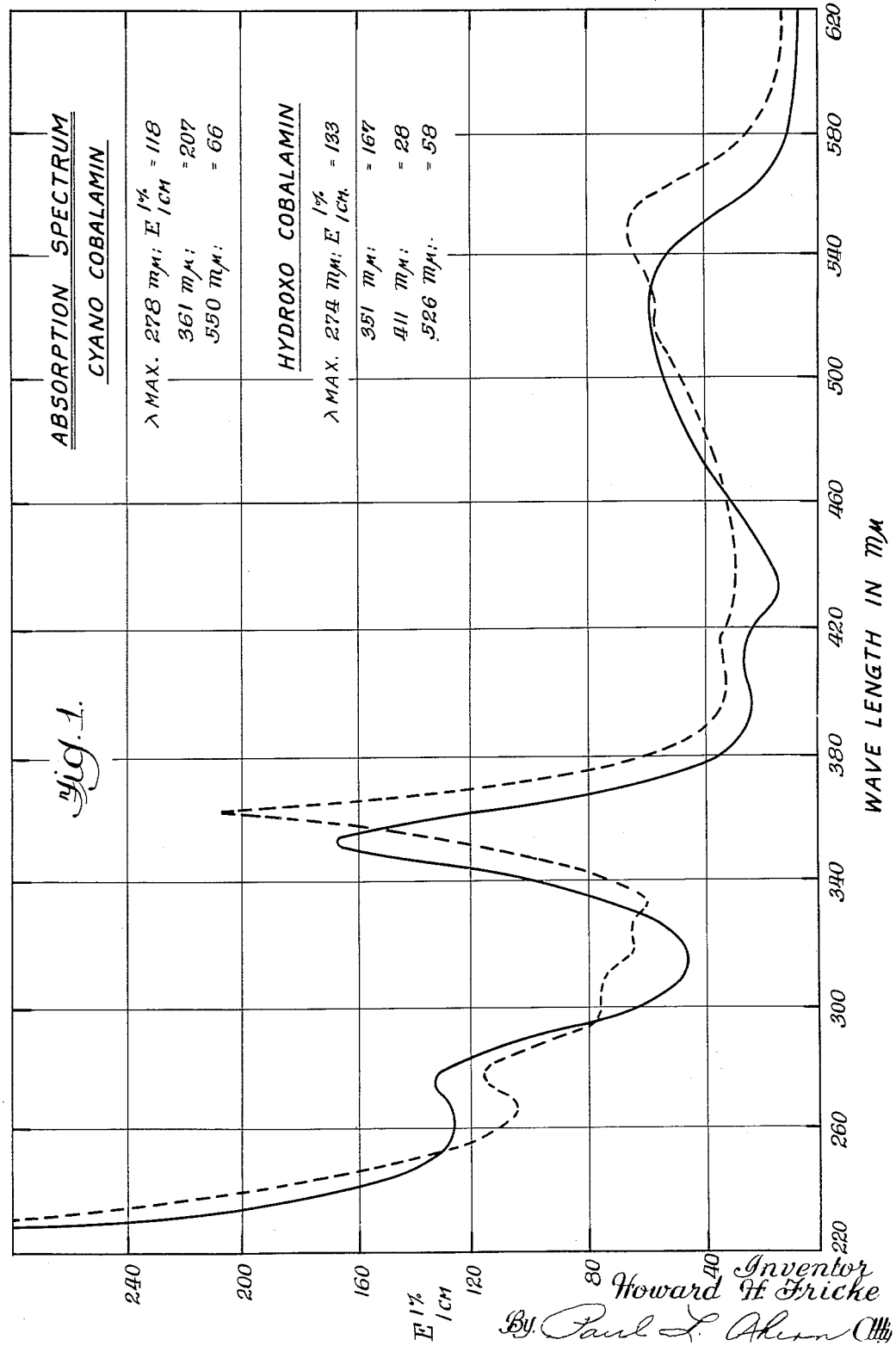

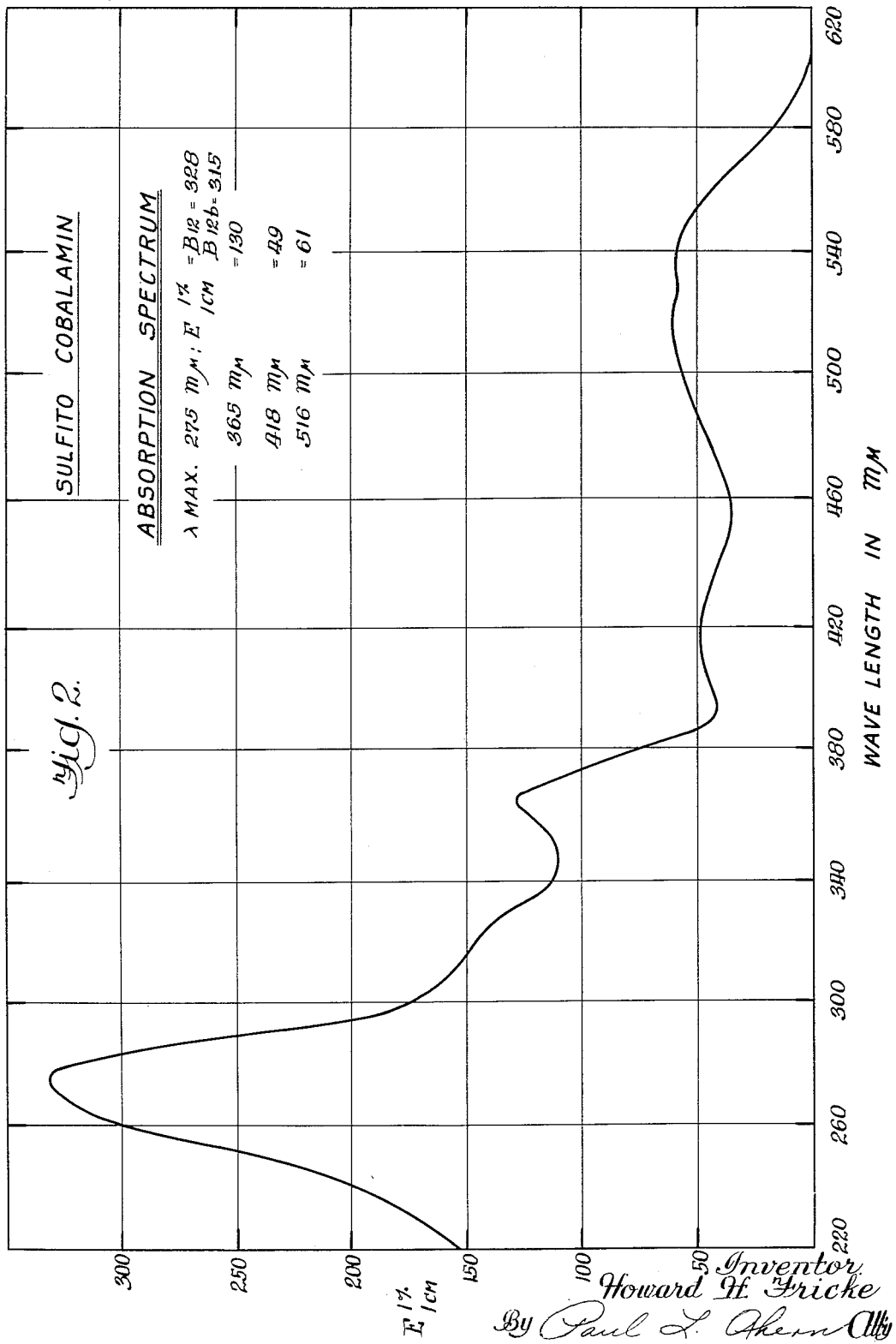

2,721,162

SULFITOCOBALAMIN AND PROCESS OF PREPARING THE SAME

Howard H. Fricke, Grayslake, Ill., assignor to Abbott Laboratories, North Chicago, Ill., a corporation of Illinois Application September 5, 1952, Serial No. 308,127

11 Claims. (Cl. 167—81)

This invention relates to stable vitamin products and more particularly to a novel cobalamin derivative, namely sulfitocobalamin.

In the prior art an antipernicious anemia factor was isolated and described by Rickes et al., Science, 107, 396, (1948); and Rickes et al., Science, 108, 134 (1948). Rickes et al. called the antipernicious anemia factor vitamin $B_{12}$, which name was subsequently adopted by U. S. Pharmacopoeia, 3rd sheet supplement to 13th volume of the U. S. Pharmacopoeia. Subsequently, Pierce et al., JACS, 71, 2952, (1949) isolated and described another compound having antipernicious anemia activity, and since the compound was very closely related to the vitamin $B_{12}$ they called it vitamin $B_{12b}$. The two compounds show different absorption spectrum maxima, which is a means used to identify the two compounds. For instance, Brink et al., JACS, 71, 1954 (1949) showed the absorption spectrum maxima for vitamin $B_{12}$ to be at 2780 Å., 3610 Å., and 5500 Å. (10. Å=$1\mu$); whereas Pierce et al., supra, showed the absorption spectrum maxima for vitamin $B_{12b}$ to be at $273\mu$, $351\mu$, and $525\mu$. Vitamin $B_{12}$ has been identified chemically as cyanocobalamin, and vitamin $B_{12b}$ has been identified as hydroxocobalamin.

Vitamin $B_{12}$ and vitamin $B_{12b}$, as pure crystalline products in aqueous solution are relatively stable, but as other ingredients are added to the solution the vitamins may be destroyed. For instance, Gakenheimer et al., J. A. Pharm. Assoc., 28, 660 (December 1949), shows the vitamin $B_{12}$ is incompatible with ascorbic acid and is rapidly destroyed. It is now known that vitamin $B_{12b}$ is even more rapidly destroyed by the addition of ascorbic acid to aqueous solutions thereof, and is almost instantaneously destroyed by the addition of about 10 mg. per cc. of ascorbic acid to aqueous solutions of vitamin $B_{12b}$ at about room temperature. Also, both vitamin $B_{12}$ and vitamin $B_{12b}$ are even more rapidly destroyed as the temperature of such solutions is increased.

The present application is a continuation in part of my copending application, Serial No. 172,396, filed July 7, 1950, which was copending with my earlier application, Serial No. 118,197, filed September 27, 1949 both now abandoned. In S. N. 172,396 there is described a stable addition product obtained by adding sodium bisulfite to solutions of vitamin $B_{12}$ (cyanocobalamin) or vitamin $B_{12b}$ (hydroxocobalamin). In Serial No. 118,197 there is described a process for stabilizing vitamin $B_{12}$ by adding a soluble bisulfite to solutions containing vitamin $B_{12}$. I have now discovered that a new and separate entity, identified as sulfitocobalamin, is formed when a soluble bisulfite such as sodium bisulfite is added to a solution containing a cobalamin derivative such as cyanocobalamin or hydroxocobalamin, in an amount in excess of that required to form sulfitocobalamin with the cobalamin moiety present in the solution. The resulting sulfitocobalamin shows a separate and distinct absorption spectra as indicated in Figure 2. The absorption maxima for sulfitocobalamin under these conditions are $270-280\mu$, $308-310\mu$, $364-366\mu$, $415-422\mu$, and $516-540\mu$. A solution of sulfitocobalamin prepared from cyanocobalamin is found to contain no cyanoradical.

Sulfitocobalamin is found to possess biological activity equivalent to that of cyanocobalamin. In the presence of even a minute excess of sulfite ions (for example, as little as 0.01%, sulfitocobalamin is substantially more stable than cyanocobalamin in the presence of ascorbic acid in aqueous solution.

Referring to the drawings:

Figure 1 is a graph showing the absorption spectra of crystalline vitamin $B_{12}$ (cyanocobalamin) and of vitamin $B_{12b}$ (hydroxocobalamin);

Figure 2 is a graph showing the absorption spectrum of the product of this invention, sulfitocobalamin in aqueous solution in the presence of sulfite ions.

The absorption spectrum curves of Fig. 1 show the slight differences, and the overall similarity between cyanocobalamin and hydroxocobalamin. As noted above, the absorption spectrum of cyanocobalamin shows the maxima at $278\mu$, $361\mu$, and $550\mu$. The absorption maxima for hydroxocobalamin are $273\mu$, $351\mu$, and $525\mu$. The spectrum curves of the two compounds clearly show that the two compounds are different, though related.

A comparison of the spectrum curves of Fig. 1 and the spectrum curve of Fig. 2 clearly shows that sulfitocobalamin is a chemical entity distinctly different from cyanocobalamin and hydroxocobalamin.

In more specific detail the following examples will illustrate the invention:

*Example I*

About 14.3 mg. of crystalline cyanocobalamin is dissolved in 25 cc. of water. The solution shows absorption spectrum maxima at $278\mu$, $361\mu$, and $550\mu$ (shown by the broken line in Fig. 1). About 25 mg., or equivalent to 0.1% by weight, of sodium bisulfite is dissolved in the solution, and the solution allowed to stand at room temperature for about 24 hours. At the end of 24 hours a new chemical is formed having absorption spectrum maxima in solution at $270-280\mu$, $364\mu$, and $540\mu$ (shown by the curve of Fig. 2).

Sulfitocobalamin may be recovered from the mother liquor by extraction with a suitable solvent such as methanol. The residue after evaporation of the methanol may be dissolved in water, and the solution thus formed may be passed over a column of ion exchange resins (Amberlite IR–120 and Amberlite IR–4B). The ion exchange resins remove the sulfito radical and exchange it for the hydroxo-radical, thereby producing hydroxocobalamin. The solution recovered from the column is concentrated under vacuum to about 1 cc., and about 6 cc. of acetone is added to the solution which causes hydroxocobalamin to crystallize. An aqueous solution of the crystallized hydroxocobalamin gives the characteristic absorption spectrum curve of hydroxocobalamin shown in the solid curve of Fig. 1.

*Example II*

Among 0.485 mg. of crystalline cyanocobalamin dissolved in about 20 cc. of water, gives absorption spectrum maxima at $278\mu$, $361\mu$, and $549\mu$.

About 0.500 mg. of crystalline hydroxocobalamin dissolved in 20 cc. of water, gives absorption spectrum maxima at $273\mu$, $352\mu$, $411\mu$, and $527\mu$.

About 20 mg. or about 0.1% by weight, of sodium bisulfite is added to each of the above solutions, and after standing for about 72 hours at room temperature, the absorption spectrum maxima of the two solutions is as follows:

The solution which originally contained cyanocobalamin now shows absorption spectrum maxima at 275μ, 364–365μ, 416–418μ, and 516μ.

The solution which originally contained hydroxocobalamin now shows absorption spectrum maxima at 275μ, 365μ, 418–422μ, and 516μ.

Within experimental error the absorption spectrum maxima of the two solutions show that cyanocobalamin and hydroxobalamin each form sulfitocobalamin when treated with sodium bisulfite in excess.

In the examples above, the soluble bisulfite used is sodium bisulfite, but any water-soluble bisulfite salt may be used. In place of the sodium bisulfite, other alkali metal and alkali earth metal bisulfites may be used, such as potassium, lithium, calcium, magnesium, etc. Other suitable salts are the nitrogen salts including the ammonium salt as well as the substituted ammonium salts including the primary, secondary, and tertiary alkyl and substituted alkylamine bisulfites and the corresponding ammonium bisulfites. The alkyl groups include methyl, ethyl, propyl, butyl, etc., amine salts, as well as the corresponding hydroxyalkyl or alkanol amine salts. The phenyl alkylamines, e. g., benzylamine, as well as other aromatic amines, e. g., aniline, may also be employed. While, as indicated above, any water-soluble bisulfite salt may be used, it is preferable not to use salts of relatively high toxicity, such as barium bisulfite, etc. In the final solution, the sulfitocobalamin should be prepared with a non-toxic soluble bisulfite, as such solutions are generally injectable therapeutic products.

Others may readily adapt the invention for use under various conditions of service, by employing one or more of the novel features disclosed or equivalents thereof. As at present advised with respect to the apparent scope of my invention, I desire to claim the following subject matter.

I claim:

1. The compound sulfitocobalamin characterized by absorption spectrum maxima at 270–280μ, 364–366μ, 415–422μ, and 516–540μ.

2. The process of preparing sulfitocobalamin which comprises, intimately contacting a cobalamin derivative selected from the class consisting of cyanocobalamin and hydroxocobalamin with a water-soluble bisulfite salt in excess of the amount required to react with the cobalamin moiety present in the solution.

3. A process according to claim 2 in which the bisulfite salt is present to the extent of about 0.01% to about 5.0%.

4. The process of preparing sulfitocobalamin which comprises, intimately contacting an aqueous solution of cyanocobalamin with a water-soluble bisulfite salt selected from the group consisting of alkali metal, alkaline earth, and amine salts in excess of that amount required to react with the cobalamin moiety present in the solution.

5. The process of preparing sulfitocobalamin which comprises, intimately contacting an aqueous solution of hydroxocobalamine with a water-soluble bisulfite salt selected from the group consisting of alkali metal, alkaline earth, and amine salts in excess of that amount required to react with the cobalamin moiety present in the solution.

6. The process of preparing sulfitocobalamin which comprises, intimately contacting an aqueous solution of a cobalamin derivative selected from the class consisting of cyanocobalamin and hydroxocobalamin with sodium bisulfite in excess of that amount required to react with the cobalamin moiety present in the solution.

7. The process of preparing sulfitocobalamin which comprises, intimately contacting an aqueous solution of a cobalamin derivative selected from the class consisting of cyanocobalamin and hydroxocobalamin with potassium bisulfite in excess of that amount required to react with the cobalamin moiety present in the solution.

8. The process of preparing sulfitocobalamin which comprises, intimately contacting an aqueous solution of cyanocobalamin with sodium bisulfite in excess of that amount required to react with the cobalamin moiety present in the solution.

9. The process of preparing sulfitocobalamin which comprises, intimately contacting an aqueous solution of hydroxocobalamin with sodium bisulfite in excess of that amount required to react with the cobalamin moiety present in the solution.

10. The process of preparing sulfitocobalamin which comprises, intimately contacting an aqueous solution of a cobalamin derivative selected from the class consisting of cyanocobalamin and hydroxocobalamin with ammonium bisulfite in excess of that amount required to react with the cobalamin moiety present in the solution.

11. A stable, aqueous solution containing sulfitocobalamin as an active ingredient, and an excess of sulfite ions.

References Cited in the file of this patent

UNITED STATES PATENTS

| | | |
|---|---|---|
| 1,563,086 | Hooper | Nov. 24, 1925 |
| 1,924,685 | Goldberg | Aug. 29, 1933 |
| 2,041,436 | Schuleman | May 19, 1936 |
| 2,187,467 | Stuart | Jan. 16, 1940 |
| 2,367,302 | Moore | Jan. 16, 1945 |
| 2,427,692 | Ruskin | Sept. 23, 1947 |

OTHER REFERENCES

Merck Index, 5th edition (1940), pg. 506.

Rusby, Bliss and Ballard—Properties and Uses of Drugs (1930), pg. 506.

U. S. Dispensatory, 24th Ed., (1947), pg. 1588.

Girdwood—Lancet, Aug. 20, 1949, pg. 346.

Stokstad—Federation Proceedings (American Society of Biological Chemists), March 1949, pg.257.

Amber-hi-Lites, published by Rohm & Haas, Number 3, August 1949, first page.

Pierce—Journal of the American Chemical Society, vol. 71, August 1949, pg. 2952.

Brockman—Journal of the American Chemical Society, vol. 72, February 1950, pg. 1042.